Nov. 30, 1948.   J. L. VINT, JR   2,454,981
AIRCRAFT CONTROL
Filed July 31, 1945
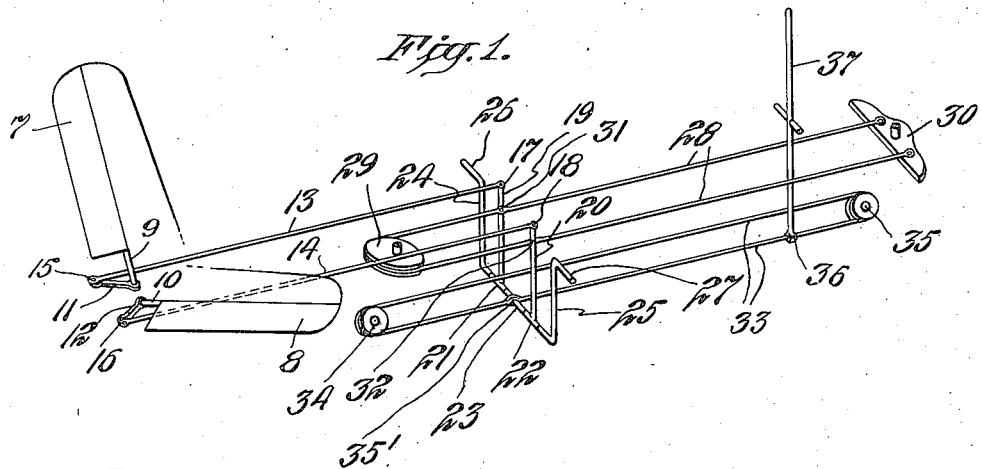
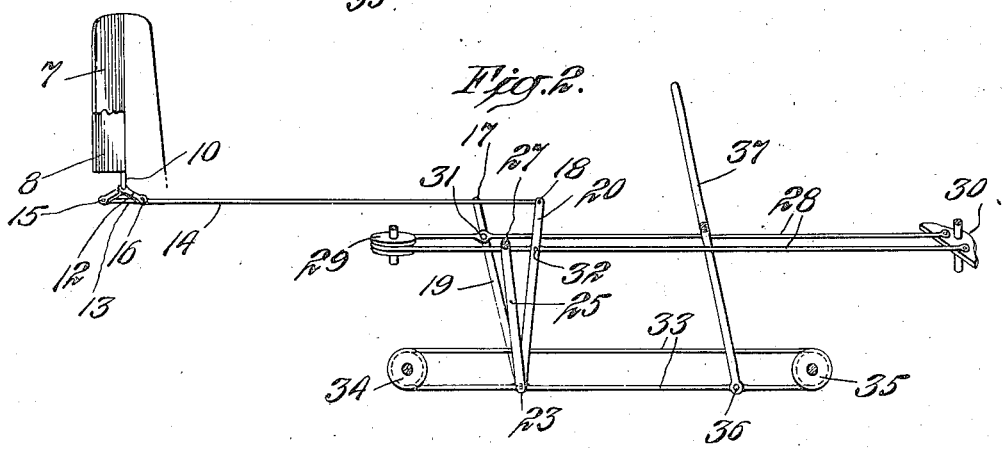
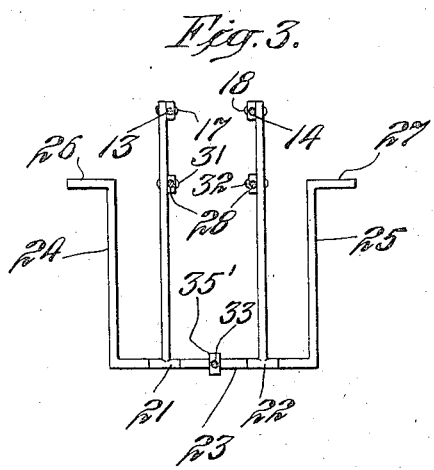
INVENTOR
JESSE L. VINT JR.
BY
ATTORNEY Patented Nov. 30, 1948

2,454,981

UNITED STATES PATENT OFFICE 2,454,981

AIRCRAFT CONTROL

Jesse L. Vint, Jr., Wichita, Kans., assignor to Beech Aircraft Corporation, Wichita, Kans., a corporation of Delaware Application July 31, 1945, Serial No. 608,003

4 Claims. (Cl. 244—83)

The invention here disclosed relates to the operation of aircraft controls, particularly those of the composite type in which two control surfaces are at times both operated in the same direction and at other times in reverse directions, or in various combinations of both such operations.

An example of such controls is the so-called "V-tail" empennage in which duplicate control surfaces in V-shaped relation are rocked in the same direction to act as elevators and can be turned in reverse directions to serve as rudders.

Particular objects of this invention are to provide simple, positive, practical and efficient means for effecting all the necessary variable operations of such "V-tail" controls, which will be light in weight, inexpensive in construction, easy to maintain, service and inspect.

Especially it is an object of the invention to assure transfer of the proper ratios of movement from the control stick and rudder bar or equivalent operating devices, to the movable elements acting as part vertical and part horizontal control surfaces.

Other objects of the invention are to accomplish the foregoing with mechanism of as few and simple parts as possible and without the requiring of special parts or fittings such as self-aligning bearings, universal joints and the like.

Other desirable objects and the novel features of construction, combinations and relations of parts by which the purposes of the invention are attained are set forth or will appear in the course of the following specification.

The drawing accompanying and forming part of the specification illustrates a present commercial embodiment of the invention. Structure may be modified and changed, however, as regards this illustration, all within the true intent and broad scope of the invention as hereinafter defined and claimed.

Fig. 1 in the drawing is a diagrammatic representation of the invention;

Fig. 2 is a diagrammatic side elevation of the invention;

Fig. 3 is a broken sectional detail of the swinging yoke and push levers constituting the compound motion transmitting portion of the apparatus.

In Fig. 1 the movable control surfaces of a V-tail assembly are indicated at 7, 8, carried by upwardly divergent shafts 9, 10. The latter are equipped at their lower ends with horns or arms 11, 12.

Push rods 13, 14, are shown pivotally connected at their rearward ends with the arms 11 and 12 at 15, 16, and pivotally connected at their forward ends at 17, 18, with the upper ends of upright actuating levers 19, 20.

These actuating levers are shown fulcrumed at their lower ends at 21, 22, on a pivot bar 23 carried by suspension levers 24, 25, having coaxial pivotal mountings 26, 27 at their upper ends.

The levers 19, 20, are directly operated, in the illustration, by a rudder cable 28 looped about a guide sheave 29, connected at its opposite ends with a rudder bar 30 and pivotally connected at its intermediate portions with said levers at 31, 32.

The pivotal connections 31, 32, between the opposite sides of the rudder cable and the actuating levers 19, 20, are shown located below the upper ends of these levers, with the levers equalized or in the neutral position shown in Fig. 1, substantially in line with the pivotal axes 26, 27, of the fulcrum carrying levers 24, 25.

The levers 24, connected as illustrated, constitute a yoke and this yoke, when stationary, provides a fixed fulcrum for the levers 19, 20. When, therefore, the rudder bar is turned, levers 19, 20, attached to opposite sides of the rudder cable will be rocked, one forwardly and the other rearwardly, about the fulcrum center 23 to turn the control surfaces 7 and 8 in opposite directions, that is, one upwardly and the other downwardly or, as may be considered, both to one side, for steering purposes.

Simultaneous adjustment of the control surfaces in the same direction vertically, that is, both up or both down for altitude control, is accomplished by rocking the fulcrum yoke to force the actuating levers 19, 20, to swing about pivot points 31, 32, as their fulcrums.

Such movement of the yoke is accomplished in the present disclosure by means of an endless cable 33 looped about supporting sheaves 34, 35, pivotally connected with the fulcrum bar 23 at 35' and pivotally connected at 36 with the lower end of a control stick 37.

With the rudder bar centered and the levers 19, 20, in line with the sides of the fulcrum yoke, the pivotal centers 31, 32, will be in line or substantially in line with the yoke supporting centers 26, 27, and the control surfaces 7 and 8 will be in their neutral or centered positions. Pulling back on the control stick will have the effect of rocking the yoke forwardly, carrying the lower ends of levers 19, 20, forward and causing them to fulcrum on the cable connections 31, 32, and thus to push back on the rods or links 13, 14, to rock both control surfaces upward. Forward movement of the stick will produce the opposite effect, swinging the yoke rearwardly and rocking the upper ends of levers 19, 20, forwardly about centers 31, 32, to simultaneously lower the inclined tail surfaces 7, 8.

The control surfaces may thus be operated at times either as rudders or as elevators and, since operation for one function does not interfere with operation of the other function, the adjustments may be composites of both functions.

Fig. 2 shows how, for example, with the rudder bar turned for steering and with one actuating lever 19 rocked upwardly and the other, 20, forwardly, these levers are still free both to pivot about their centers 31, 32, if the stick is pulled back or pushed forward, the yoke being swung, in such event, either forwardly or rearwardly to cause the fulcrum bar 23 to swing the upper ends of both levers rearwardly or forwardly. Thus elevator control effects may be superimposed upon rudder control effects, and rudder control may be superimposed on elevator control at any and at all times and without the control of one type washing out the control of the other type.

The mechanism for accomplishing the universal or composite adjustments described is relatively simple, takes up but small space and while requiring no particular servicing, may be fully accessible for inspection and the like. By proper proportioning of leverage centers the desired ratio of movements effected by rudder bar and control stick may be determined and these may be determined and maintained under all operating conditions.

The simplicity of parts and direct interaction permit use of ordinary pivotal connections and avoid need for universal joints or other special or complicated parts.

What is claimed is:

1. In combination, movable aircraft control surfaces mounted for conjoint and reverse operations, actuating levers for simultaneously shifting said control surfaces both in the same or reverse directions, movably supported coaxial fulcrums for said levers, means for rocking said levers in opposite directions on said coaxial fulcrums to accomplish reverse operation of said control surfaces and including pivotal connections with the levers adapted to serve as fulcrums for said levers when said coaxial fulcrums are shifted, and means for effecting the shifting of said coaxial fulcrums about the centers of said pivotal connections to accomplish simultaneous operation of the control surfaces in the same direction, said last mentioned means including a support carrying the coaxial fulcrums and mounted to swing about a center substantially coinciding with the centers of said pivotal connections when said actuating levers are equalized.

2. In combination, movable aircraft control surfaces mounted for conjoint and reverse operations, actuating levers for simultaneously shifting said control surfaces both in the same or reverse directions, movably supported coaxial fulcrums for said levers, means for rocking said levers in opposite directions on said coaxial fulcrums to accomplish reverse operation of said control surfaces and including pivotal connections with the levers adapted to serve as fulcrums for said levers when said coaxial fulcrums are shifted, and means for effecting the shifting of said coaxial fulcrums about the centers of said pivotal connections to accomplish simultaneous operation of the control surfaces in the same direction, said latter means including a swinging yoke carrying a common fulcrum on which said levers are coaxially journalled.

3. In combination, movable aircraft control surfaces mounted for conjoint and reverse operations, actuating levers for simultaneously shifting said control surfaces both in the same or reverse directions, movably supported coaxial fulcrums for said levers, means for rocking said levers in opposite directions on said coaxial fulcrums to accomplish reverse operation of said control surfaces and including pivotal connections with the levers adapted to serve as fulcrums for said levers when said coaxial fulcrums are shifted, and means for effecting the shifting of said coaxial fulcrums about the centers of said pivotal connections to accomplish simultaneous operation of the control surfaces in the same direction, the latter means including a pivotally suspended yoke having a cross bar at the swinging end of the same on which the actuating levers are coaxially fulcrumed, the pivotal connections with said levers being disposed to substantially align with the pivotal axis of support of the swinging yoke and said levers extending beyond said pivotal connections and having push links pivotally connected with the free ends of the same for actuating said control surfaces.

4. Mechanism for actuating aircraft control surfaces of the type which are variably adjustable in the same or in reverse directions and comprising levers having connections to effect similar and reverse adjustments of said control surfaces, a movably supported coaxial common fulcrum for both levers, individual fulcrums for the respective levers and located at a distance from the common fulcrum, means for shifting the common fulcrum in opposite directions to simultaneously effect like adjustments of both levers about said individual fulcrums and means for simultaneously shifting said individual fulcrums in opposite directions to simultaneously effect reverse adjustments of said levers about said common fulcrum, said movably supported common fulcrum comprising a yoke pivotally supported at the open end of the same and having a pivot rod forming the closed end of the yoke and on which the actuating levers are journaled.

JESSE L. VINT, Jr.

REFERENCES CITED

The following references are of record in the file of this patent:

UNITED STATES PATENTS

| Number | Name | Date |
|---|---|---|
| 2,225,002 | Focke | Dec. 17, 1940 |

FOREIGN PATENTS

| Number | Country | Date |
|---|---|---|
| 11,501 | Great Britain | 1909 |
| 852,599 | France | Oct. 30, 1939 |
| 681,209 | Germany | Feb. 9, 1940 |